(12) United States Patent
Ishida et al.

(10) Patent No.: US 6,586,853 B2
(45) Date of Patent: Jul. 1, 2003

(54) ROTARY COOLING FAN FOR AN AC GENERATOR

(75) Inventors: Sakae Ishida, Hitachinaka (JP); Susumu Sasaki, Naka (JP); Yoshiaki Honda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/774,092

(22) Filed: Jan. 31, 2001

(65) Prior Publication Data

US 2001/0010434 A1 Aug. 2, 2001

(30) Foreign Application Priority Data

Jan. 31, 2000 (JP) .......................................... 2000-027215

(51) Int. Cl.[7] .............................. H02K 9/00; H02K 9/06; H02K 1/22
(52) U.S. Cl. .......................... 310/62; 310/263; 310/63; 310/52; 310/58
(58) Field of Search ................................ 310/263, 49 A, 310/52, 65, 62, 68 D, 40 R, 63, 58

(56) References Cited

U.S. PATENT DOCUMENTS

| | | | |
|---|---|---|---|
| 3,787,014 A | * | 1/1974 | Story et al. .................... 248/14 |
| 4,115,030 A | * | 9/1978 | Inagaki et al. ............. 416/93 R |
| 4,184,804 A | * | 1/1980 | Inagaki et al. ........... 415/213 R |
| 4,186,320 A | * | 1/1980 | Hillman ........................ 310/93 |
| 4,799,309 A | * | 1/1989 | Cinzori et al. ................ 29/596 |
| 4,879,483 A | | 11/1989 | Barahia ....................... 310/63 |
| 4,961,016 A | * | 10/1990 | Peng et al. .................... 310/62 |
| 5,122,705 A | * | 6/1992 | Kusase et al. ................ 310/68 |
| 5,693,992 A | | 12/1997 | Kurusu et al. ................ 310/63 |
| 5,742,107 A | * | 4/1998 | Asao et al. .................... 310/62 |
| 5,793,143 A | * | 8/1998 | Harris et al. ................ 310/181 |
| 5,962,942 A | * | 10/1999 | Pullen et al. ............... 310/156 |
| 5,977,668 A | * | 11/1999 | Yoshioka ..................... 310/263 |
| 5,998,891 A | * | 12/1999 | Chen et al. ............... 310/68 R |
| 6,166,462 A | * | 12/2000 | Finkenbinder et al. ........ 310/63 |
| 6,369,471 B1 | * | 4/2002 | Whitted et al. ............. 310/263 |

FOREIGN PATENT DOCUMENTS

| | | | |
|---|---|---|---|
| EP | 0500442 | | 2/1991 |
| JP | 2-26249 | | 1/1990 |
| JP | 404038149 A | * | 2/1992 |
| JP | 04-200255 | | 7/1992 |
| JP | 5-30707 | | 2/1993 |
| JP | 7-194059 | | 7/1995 |

OTHER PUBLICATIONS

European Search Report.

* cited by examiner

*Primary Examiner*—Nestor Ramirez
*Assistant Examiner*—Julio C. Gonzalez
(74) *Attorney, Agent, or Firm*—Crowell & Moring LLP

(57) ABSTRACT

Since a structure of a cooling fan of an alternative current generator for a vehicle is formed with a resin molding product having an insert metal fitting, a freedom degree on said fan design shape configuration and said installation performance of said fan to a core can be compatible. A cooling fan structure having a high shape configuration design freedom degree and having an installation strength similar to that of said fan according to said prior art can be obtained.

2 Claims, 5 Drawing Sheets

ROTARY COOLING FAN FOR AN AC GENERATOR

BACKGROUND OF THE INVENTION

1. <Technical Field>

The present invention relates to a vehicle AC generator or an alternative current generator for a vehicle and in particularly to a ventilation cooling fan of an alternative current generator for vehicle and a manufacturing method of the same.

2. <Prior Art>

FIG. 9 is a cross-sectional view showing a construction of an alternative current generator for vehicle according to the prior art. A rotor 1 is constituted by a bobbin 3 to which a field coil 4 is wound, a yoke 5 for forming a magnetic iron core, a pair of cores 2 comprised of plural claw shape configuration portion chips (plates), a front fan 15 and a rear fan 14 which are welded and fixed to an end face of the core 2, a rotating shaft 6, and a slip ring 7. The pair of cores 2 sandwiches the bobbin 3 to which the field coil 4 is wound and the yoke 5 and claws 2a are arranged to mesh, and the cores 2 are inserted and fixed to a substantial center portion of the rotating shaft 6.

To an outer peripheral portion of the rotor 1 a stator 8 is arranged and to surround the stator 8 a front bracket 10 and a rear bracket 11 are installed. To one of the end portions of rotating shaft 6, a pulley 12 is installed and a rotational force of an engine not shown in figure is transmitted to the pulley 12 through a belt not shown in figure and the rotor 1 is rotated and driven. In accordance with the rotation of the rotor 1, the front fan 15 and the rear fan 16 which are installed to the core 2 rotate together and an inner portion of the generator is ventilation-cooled.

As shown in FIG. 9, the front side bracket 10 has plural intake holes 22 and the plural exhaust holes 23 and also the rear side bracket 11 has plural intake holes 22 and the plural exhaust holes 23, respectively, and in the rotation of the rotor 1 an interior portion of the alternative current generator is ventilation-cooled using the front fan 15 and the rear fan 16.

FIG. 10 is a perspective view showing a fan which is employed in the alternative current generator for vehicle according to the prior art. A conventional fan 16 is transformed from one sheet thin plate using a press working, and the structure of the fan 16 is that plural curved face (or a flat face) blades 17 are provided projectingly in an axial direction according to the transforming by a ring shape supporting plate 18 and by bending a part of the ring shape supporting plate 18. As a result, a sheet number of the blades 17 and a height of the blades 17 have a relative relationship, therefore a freedom degree in a fan design receives a restriction.

Recently, a high speed drive of an alternative current generator for vehicle comes into wide use in accordance with a high output performance request for the alternative current generator for vehicle. As the high speed drive advances, there causes a problem in which the noises of the alternative current generator for vehicle increase. Many of the noises during the high speed drive time are wind noises accompanying with the rotation of a rotor, in particular the affects by the turbulence flow noises according to the rotation of a cooling fan and the interference noises occupy a large element.

For this reason, the noise increase has restrained by an alternation of the sheet number of the blades of the cooling fan, an alternation of a curvature radius of the blades, an employment of back ward blades, and an employment of an irregular pitch arrangement of the blades. However, the silence noise performance at the vehicle side (an engine except for the alternative current generator, auxiliary machineries, etc.) is advanced, a correspondence to the low noise performance by the alternation of the shape configuration by a thin plate press transforming fan according to the prior art reaches to the limitation.

In the thin plate press transforming fan according to the prior art, since one sheet iron plate is punched out using a die and transformed by bending the iron plate, it receives many restrictions on the design relating to the sheet number of the blades, the height of the blades, and the arrangement of the blades, etc.

SUMMARY OF THE INVENTION

An object of the present invention is to obtain an alternative current generator for a vehicle wherein a fan structure in which a freedom degree on a shape configuration design can be made high, an installation strength similar to that of the thin plate transforming fan according to the prior art can be obtained, further an alternation in a fan installation process can not be generated.

According to the present invention, in an alternative current generator for a vehicle comprising a pair of cores having plural claw shape portion configuration plates, a rotating shaft inserted into a center portion of the core, a rotor inserted and fixed to the rotating shaft and having an excitation current supply use slip ring, a stator provided at an outer periphery of the rotor, and a front side bracket and a rear side bracket arranged to surround the rotor and the stator, the rotor is supported to rotate freely each of the brackets through a bearing member, the core is comprised of a pair of a front fan and a rear fan which are installed to both ends of said core, to end portions of the respective front side and rear side brackets plural intake holes are provided, and an outer peripheral portion of respective front side an rear side brackets plural exhaust holes are provided, and in accordance with a rotation of the rotor an inner portion of the generator is ventilation-cooled using the front and rear fans.

The alternative current generator for the vehicle is characterized in that at least one of the front fan and the rear fan is a resin molding fan having an insert metal fitting, and a fixing of the resin molding fan to the core is carried out by joining the insert metal fitting to the core by using a joining means such as a welding.

According to the invention, since the structure of the cooling fan is formed by the resin molding product having the insert metal fitting, the blade shape configuration can be realized by the curved face, the flat face and also the three dimensional shape configuration, and further a ring shape rectifying plate can be provided in the tip end side of the blade. Further, according to the employment of the resin molding fan, the sheet number of the blades and the suitable pitch of the blades can be established freely within a realizable degree.

Further, in the resin molding fan itself, it is difficult to obtain the full installation strength during the joining time to a back face of the core, however, in the resin molding fan having the insert metal fitting, in accordance with the insert metal fitting since the mechanical connection can be carried out by the welding etc. to the back face of the core, it is possible to ensure the installation strength similar to that of the press transforming product using the thin plate according to the prior art.

According to the invention, since the inner diameter of the ring shape supporting plate in which the blades of the cooling fan are projectingly provided is established to have substantially same diameter of the outer diameter of the rotating shaft of the rotor or the outer diameter of the slip ring which is inserted and fixed to the rotating shaft, the positioning of the axial center against the core of the cooling fan during the installation time of the cooling fan to the back face of the core can be carried out easily.

According to the invention, since to the rear face (the contact face with the core) of the ring shape supporting plate in which the blades of the cooling fan are projectingly provided, the raised portion which is suited to the root portion of the core is provided, as a result the positioning of the cooling fan against to the rotation direction of the core can be carried out easily.

DESCRIPTION OF THE INVENTION

An alternative current generator for a vehicle of the carrying-out embodiments according to the present invention will be explained referring to drawings.

Figure 4:
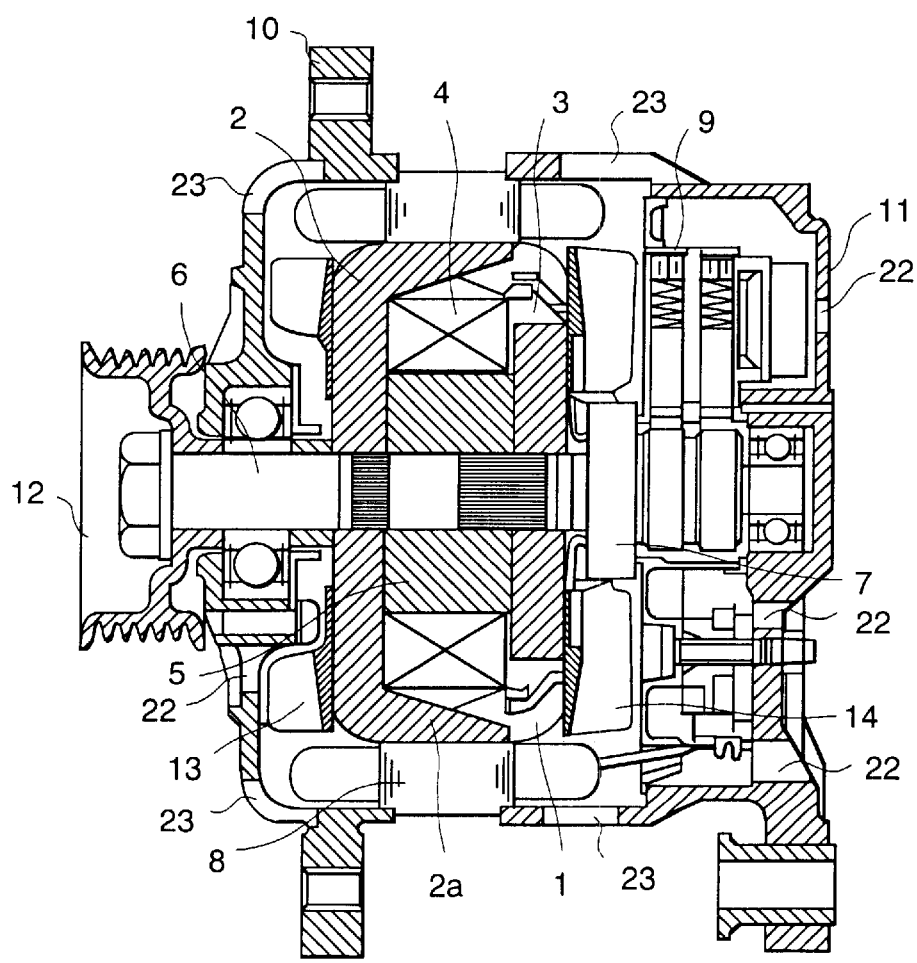
FIG. 4 is a cross-sectional view showing the alternative current generator for vehicle according to the present invention.

FIG. 4 is a cross-sectional view showing an alternative current generator for vehicle according to the present invention. In FIG. 4, a rotor 1 is constituted by a pair of claw shape cores 2 on which plural claws 2a are provided respectively, a bobbin 3 on which a field coil 4 is wound, a yoke 5 for forming a magnetic pole iron core of the bobbin 3, a rotating shaft 6, and an excitation current supply use slip ring 7. In the one pair of the cores 2, the claws 2a of the core 2 are opposed to mesh and the bobbin 3 and the yoke 5 are arranged to be sandwiched, and the rotating shaft 6 is inserted under pressure and fixed to these axial centers.

In a back face portion of the one pair of cores 2, a front fan 13 and a rear fan 14 are installed integrally to the cores 2. Further, in an one end portion of the rotating shaft 6, a pulley 12 is installed and in another end portion of the rotating shaft 6, the slip ring 7 is inserted under pressure and the pulley 12 and the slip ring 7 rotate by forming integrally with the rotating shaft 6.

A stator 8 is arranged on an outer periphery of the cores 2 to have a minute gap with the cores 2. To a brush holder 9, a voltage regulator is mounted actually. And, a front side bracket 10 and a rear side bracket 11 support the rotating shaft 6 and are arranged to surround the rotor 1 and further sandwich the stator 8.

The front side bracket 10 has plural intake holes 22 and the plural exhaust holes 23 and also the rear side bracket 11 has plural intake holes 22 and the plural exhaust holes 23, respectively, and in the rotation of the rotor 1 an interior portion of the alternative current generator is ventilation-cooled using the front fan 15 and the rear fan 16.

Carrying-Out Embodiment 1

Figure 1:
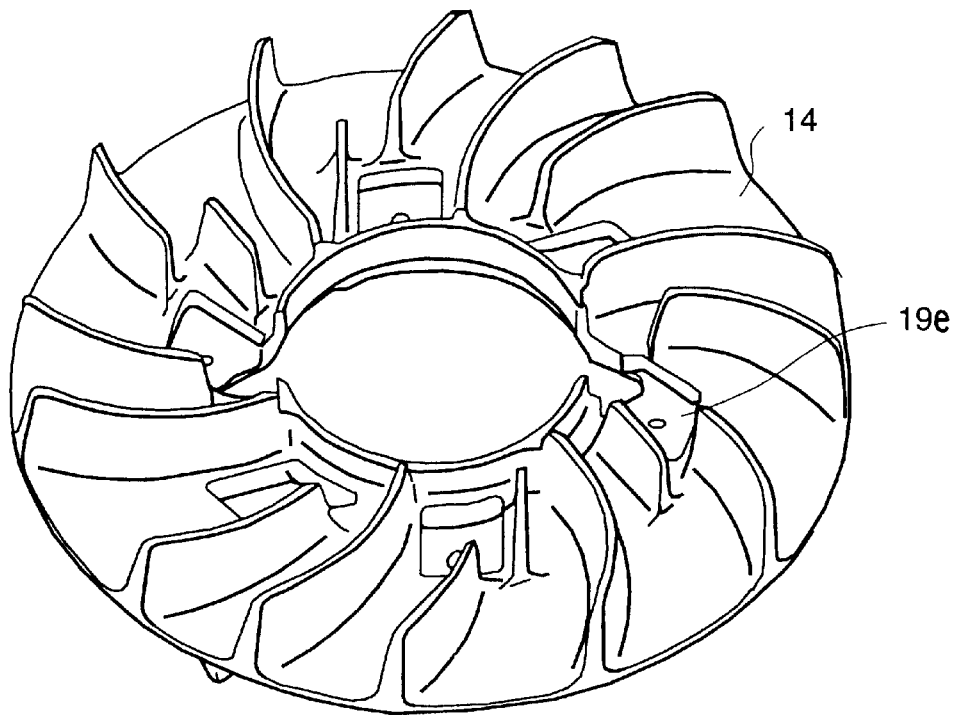
FIG. 1 is a perspective view (a blade projecting face side) showing a fan which is applied to an alternative current generator for vehicle according to the present invention.
Figure 2:
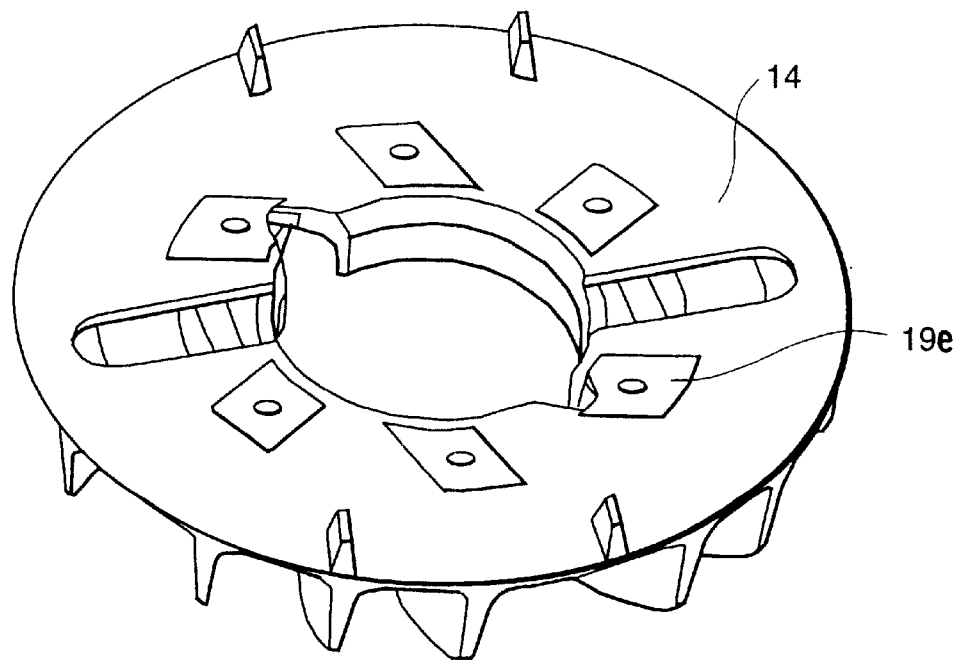
FIG. 2 is a perspective view (a back face side) showing the fan which is applied to the alternative current generator for vehicle according to the present invention.
Figure 3:
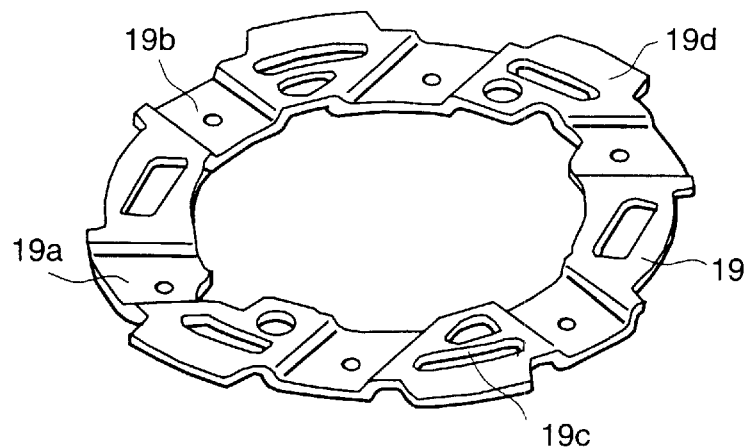
FIG. 3 is a perspective view showing an insert metal fitting which is applied to the alternative current generator for vehicle according to the present invention.

FIG. 1 and FIG. 2 are perspective views of a blade face of the rear fan 14 according to the present invention and a back face of the rear fan 14, and FIG. 3 is a perspective view of an insert metal fitting (an insert terminal) 19 according to the present invention which is molded integrally with the rear fan 14. In the respective views of FIG. 1, FIG. 2 and FIG. 3, the rear fan 14 is made of a resin product in which the insert metal fitting 19 is molded integrally. The insert metal fitting 19 is molded by molding an iron plate having SPCCt=1.2 degree using a press process.

To a flat face portion 19a of the insert metal fitting 19, plural welding portions 19b which project in an opposed side of the core 2 are provided in a peripheral direction. Further, the insert metal fitting 19 is not a mere flat plate but the insert metal fitting 19 itself is molded on an even and uneven face, and to an outer peripheral portion plural empty holes 19c or raised portions 19d are provided, as a result the shape configuration of the insert metal fitting 19 is that the combination between the resin during the insert molding time and the insert metal fitting 19 is strengthened.

In the shape configuration after the resin molding, the most part of the insert metal fitting 19 are covered by the resin, and a exposed portion 19e of the insert metal fitting 19 is only in a welding portion. The material of the rear fan 14 is used according to a glass reinforced nylon etc. taking into the consideration of the molding performance and the strength performance and the freedom degree in the design relating to the sheet number of the blades and the height of the blades, and the arrangement of the blades, etc. can be improved.

As stated in above, in the resin rear fan 14 in which the insert metal fitting 19 of the iron press product is molded integrally, since the welding portions which are projectingly provided to the insert metal fitting 19 are provided, without the alternation of the equipment it is possible to carry out the welding fixing. Further, in the above stated Carrying-Out Embodiment 1 according to the present invention, the rear fan 14 is only explained however as to the front fan 15 the same explanation will be explained.

Carrying-Out Embodiment 2

Figure 5:
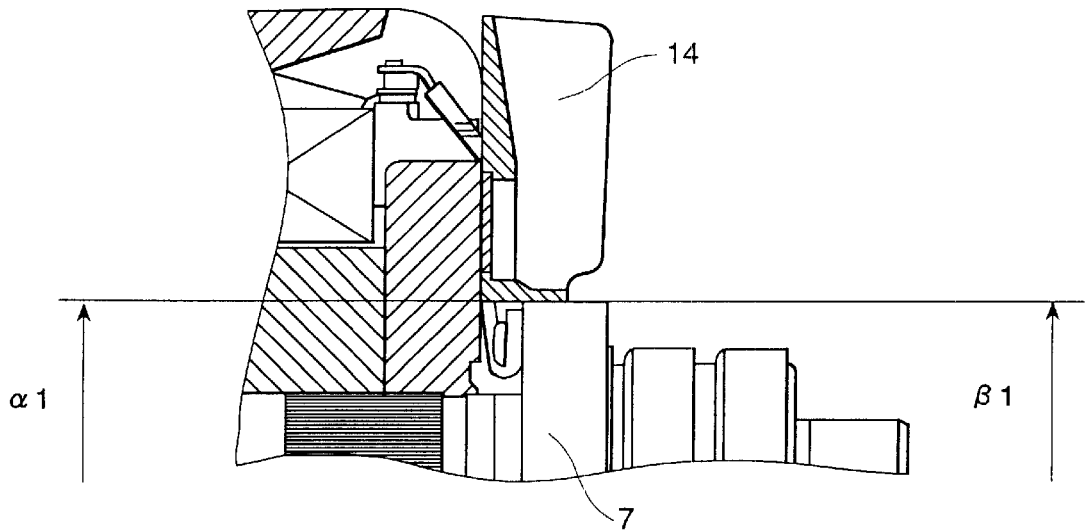
FIG. 5 is a cross-sectional view showing an installation condition of a fan which is applied to the alternative current generator for vehicle of a Carrying-Out Embodiment 2 according to the present invention.

FIG. 5 is a detailed cross-sectional view showing an installation condition of the fan to which the alternative current generator for vehicle of the Carrying-Out Embodiment 2 according to the present invention is applied. As to the procedure of the installation of the rear fan 14 to the core 2, the rear fan 14 is contacted to a back face of the core 2, and after positioning, in the welding portions 19e the welding is carried out and then the fan is fixed. In FIG. 5, a resin portion inner diameter size $\alpha_t$ of the resin mold rear fan 14 in which the insert metal fitting 19 is molded integrally is established to have the substantial same diameter of a resin portion inner diameter size $\beta_1$ of the slip ring 7.

Accordingly, according to the Carrying-Out Embodiment 2 of the present invention, it is unnecessary to carry out the positioning of the fan 14 during the axial center installation of the fan 14 to the back face of the core 2 against the core 2 of the fan 14, and accordingly the working performance during the installation time can be improved.

Carrying-Out Embodiment 3

Figure 6:
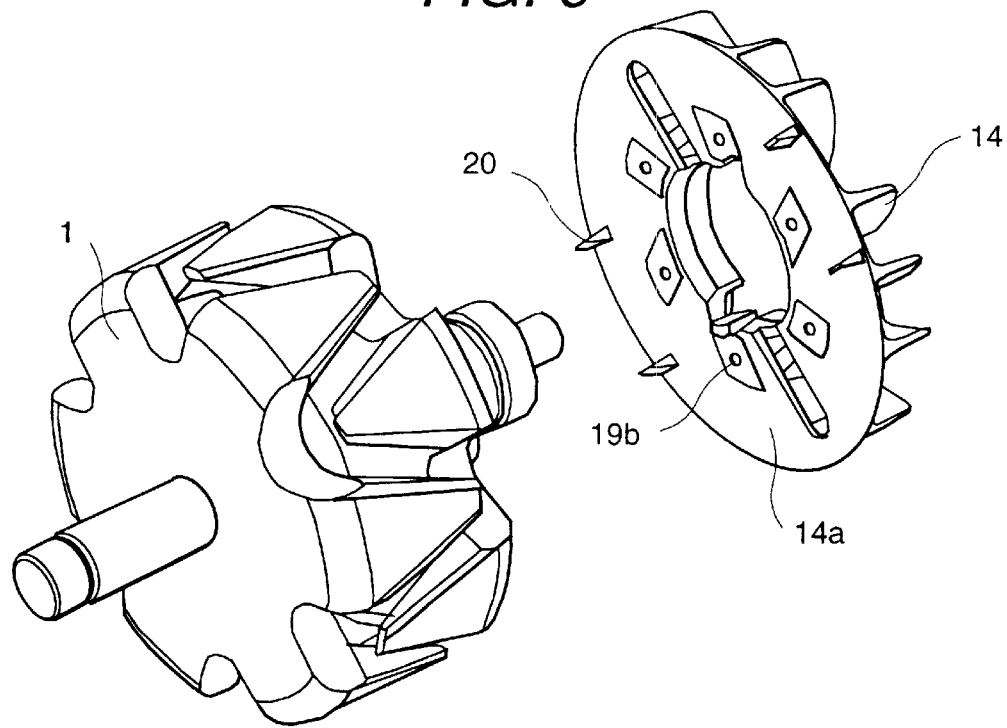
FIG. 6 is a perspective view showing a before of an installation condition of a fan which is applied to the alternative current generator for vehicle of a Carrying-Out Embodiment 3 according to the present invention.
Figure 7:
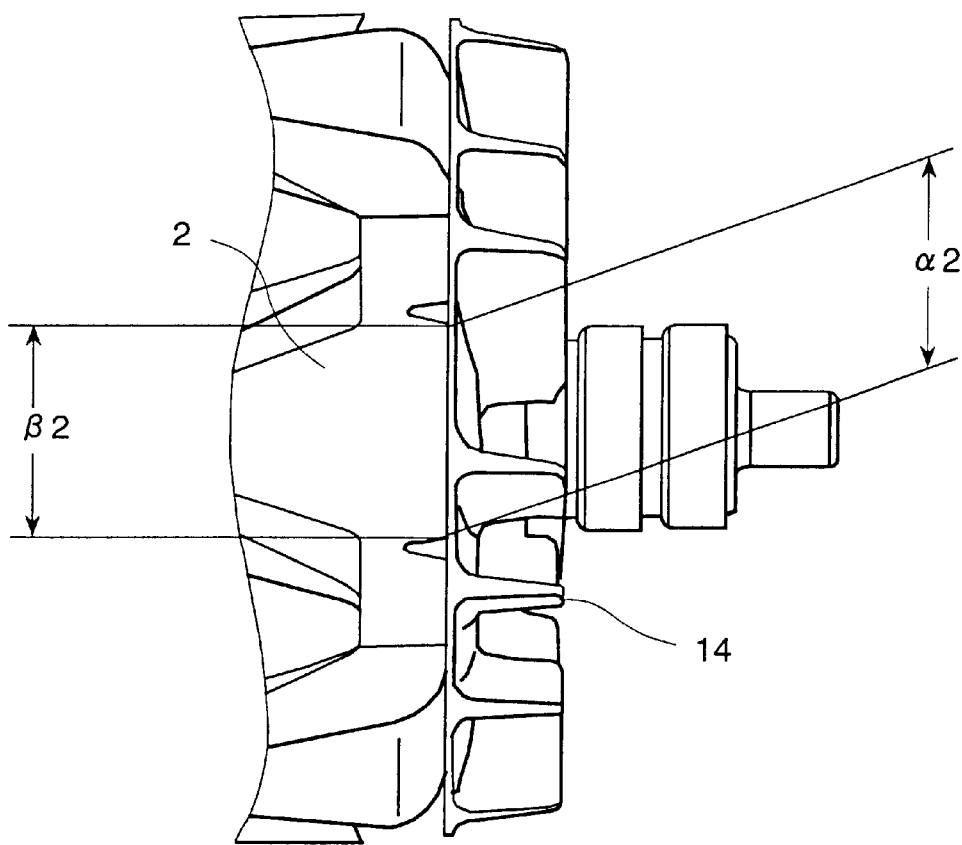
FIG. 7 is a perspective view showing an installation condition of the fan which is applied to the alternative current generator for vehicle of the Carrying-Out Embodiment 3 according to the present invention.

FIG. 6 is a perspective view showing a before condition for installing the fan which is applied to the alternative current generator for vehicle of the Carrying-Out Embodiment 3 according to the present invention to the core, and FIG. 7 is a view showing an installation condition of the fan in the alternative current generator for vehicle of the Carrying-out Embodiment 3 according to the present invention.

In FIG. 6, in a rear face portion 14a of the projecting face of the blade of the rear fan 14, a total four portions, namely one side two portions, of trapezoid shape configuration positioning use raised portions 20 which are suited to the back face portion shape configuration of the core 2 are provided. Since an interval $\alpha_2$ of the positioning use raised portions 20 is established to have a minute gap degree to a width $\beta_2$ of the back face of the core 2, during the installation time of the fan 14 to the core 2 the positioning of the rear fan 14 against the rotation direction of the core 2 can be carried out easily, the working performance during the installation time can be improved.

Figure 8:
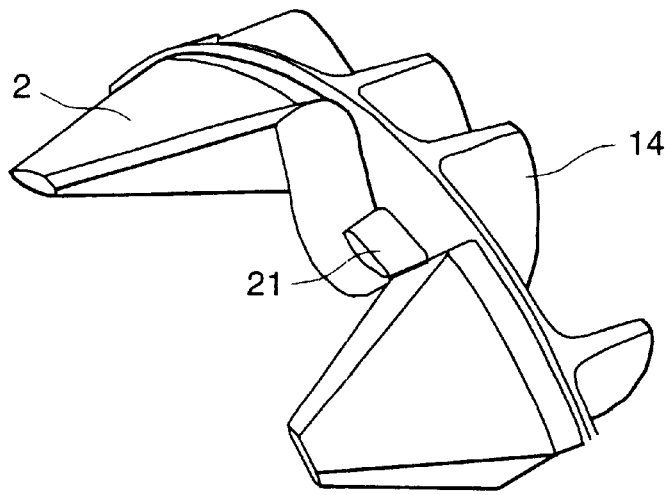
FIG. 8 is a perspective view showing another embodiment of a positioning use raised portion shape configuration in the fan which is applied to the alternative current generator for vehicle of the Carrying-Out Embodiment 3 according to the present invention.
Figure 9:
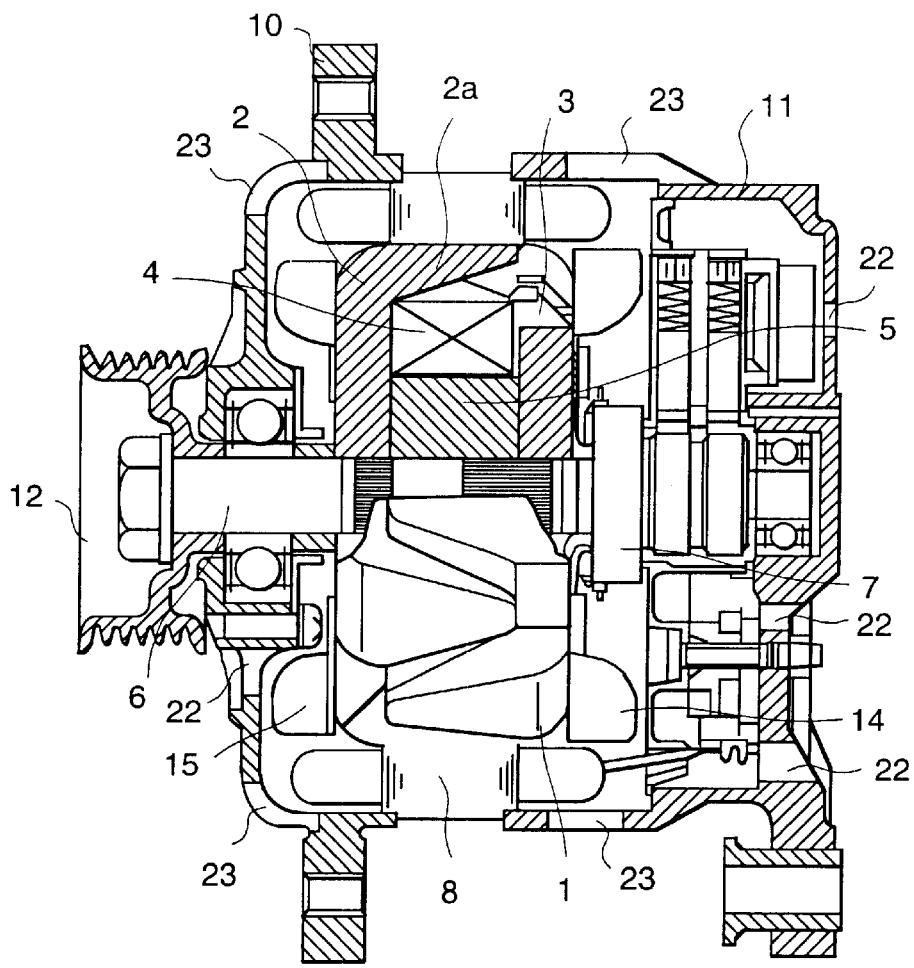
FIG. 9 is a cross-sectional view showing an alternative current generator for vehicle according to the prior art.
Figure 10:
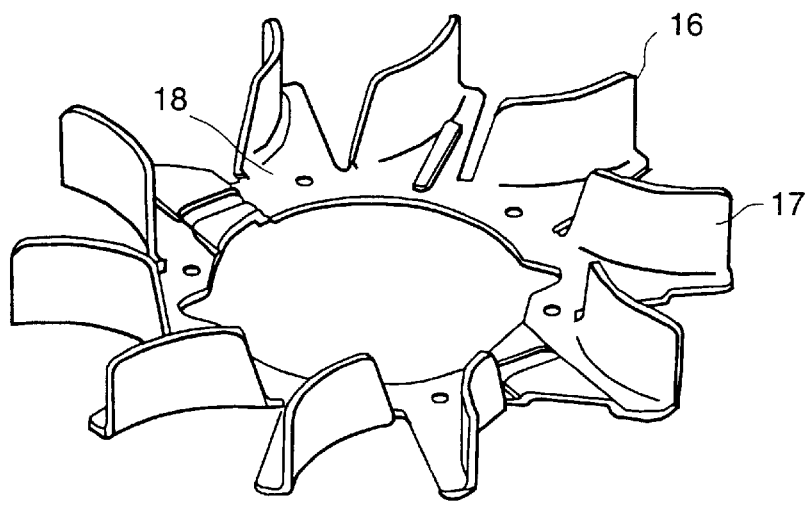
FIG. 10 is a perspective view showing a fan which is applied to the alternative current generator for vehicle according to the prior art.

Further, in the above Carrying-Out Embodiment 3 according to the present invention, the shape configuration of the positioning use raised portion 20 has the trapezoid shape configuration, but the shape configuration of the positioning use raised portion is not limited to the above, as shown in FIG. 8, a convex shape configuration 21 which is suited to the shape configuration of the root portion of the core 2 can be employed.

According to the present invention, with the above stated construction, the following effects can be obtained.

According to the present invention, in the cooling fan of the alternative current generator for vehicle, since the insert metal fitting is formed with the integral molding resin product, the freedom degree in the design relating to the sheet number of the blades of the cooling fan, the shape configuration of the blades of the cooling fan, the arrangement pitch of the blades of the cooling fan can be improved and further it is possible to carry out the welding fixing in the alternative current generator for the vehicle.

Further, according to the present invention, since the inner diameter portion of the cooling fan is established to have the substantial same to the outer diameter of the shaft or the slip ring resin portion, during the installation time the positioning of the axial center of the cooling fan and the core can be carried out easily, accordingly the working performance of the alternative current generator for the vehicle can be improved.

Further, according to the present invention, to the contacting face of the rear face of the cooling fan and the core, the raised portion suited to the back face of the core is provided, during the installation time the positioning of the rotation direction of the fan and the core is carried out easily, accordingly the working performance of the alternative current generator for the vehicle can be improved.

What is claimed is:

1. An alternating current generator for a vehicle comprising:

a core comprising a pair of plates having plural claw shaped portions;

a rotating shaft inserted into a center portion of said core;

a rotor inserted and fixed to said rotating shaft and having an excitation current supply via a slip ring;

a stator provided at an outer periphery of said rotor; and front and rear brackets arranged to surround said rotor and said stator; wherein said rotor is supported to rotate freely relative to each of said front and rear brackets through a bearing member;

said core includes a front fan and a rear fan which are installed at opposite ends of said core;

plural intake holes are provided to end portions of said respective front and rear brackets;

plural exhaust holes are provided in an outer peripheral portion of said respective front and rear brackets;

in accordance with a rotation of said rotor, an inner portion of said generator is ventilation-cooled using said front and rear fans;

at least one of said front fan and said rear fan is a resin molding fan having an insert metal fitting;

said resin molding fan is fixed to said core by joining said insert metal fitting to said core by using a joining means such as a welding;

said resin molding fan is a centrifugal fan having a ring shaped supporting plate in which plural blades are provided projecting in an axial direction; and an inner diameter of said ring shaped supporting plate is substantially equal to an outer diameter of said rotating shaft of said rotor or an outer diameter of a resin portion of said slip ring which is inserted and fixed to said rotating shaft.

2. An alternative current generator for a vehicle according to claim 1, wherein:

to a rear face of said ring shaped supporting plate, which is opposite a face from which said supporting plate blades project, a raised portion is provided which is adapted to a back face configuration of said core.

* * * * *